July 11, 1950  H. STEIMANN  2,514,906
WATERTIGHT WATCHCASE
Filed Sept. 5, 1944
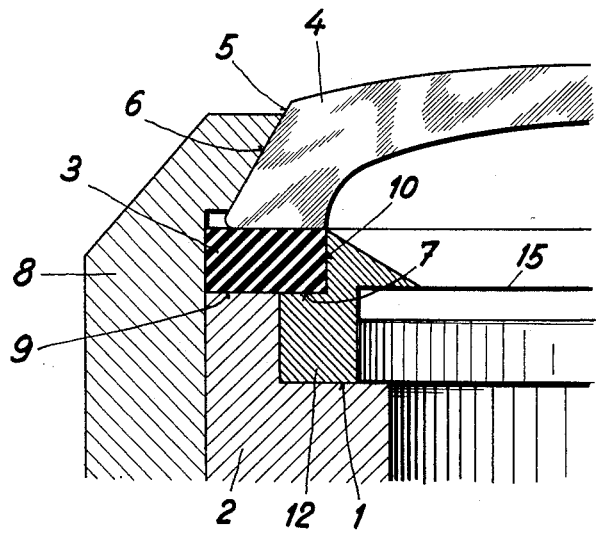
Inventor
H. Steimann
By Glascock Downing Seebold
Attys.

Patented July 11, 1950

2,514,906

UNITED STATES PATENT OFFICE 2,514,906

WATERTIGHT WATCHCASE

Hans Steimann, La Chaux-de-Fonds, Switzerland

Application September 5, 1944, Serial No. 552,756
In Switzerland December 28, 1942

3 Claims. (Cl. 58—90)

This invention relates to watertight watchcases comprising a movement, a dial, a watertight case including a packing, a breakable glass having an outer conical surface and a lower annular surface in contact with the upper surface of said packing, a bezel with a conical inner surface pressing upon said conical outer surface of said breakable glass, a center member inside said bezel, having an upper face and a shoulder, and a separate ring inside said center member and supported on said shoulder and having a horizontal annular surface flush with said upper face and a vertical annular surface forming together with said horizontal annular surface a shoulder, said separate ring holding said movement and said dial in position, and being with its upper edge in contact with said lower annular surface of said breakable glass, the bottom of said packing being supported on said upper face and on said horizontal annular surface, the inner rim of said packing being in contact with said vertical annular surface, and the outer rim with said bezel.

The accompanying drawing illustrates, by way of example, one embodiment of the watchcase according to the invention.

The single figure illustrates a section of this embodiment.

According to the drawing, a packing 3 of elastical material, for instance, of caoutchouc, is placed in a channel formed by a bezel 8, a ring 12, and a center member 2. A breakable crystal 4 is supported on this packing 3 by a lower annular surface. This crystal is of a commercial form usual in non-watertight watches, having a conical outer surface 5. The machined, inclined inner surface 6 of the bezel 8 makes contact with the conical surface 5 of the crystal, thereby pressing the latter against the packing 3. It is understood that the crystal might be an unbreakable one.

The ring 12 makes partly contact with the underside of the packing 3 and is shaped for receiving a flat dial 15. The center member 2 comprises a shoulder 1 on which the separate ring 12 is supported. The ring 12 has a horizontal annular surface 7 flush with the upper face 9 of the member 2, and a vertical annular surface 10 forming together with the surface 7 a shoulder. The ring 12 holds the movement and the dial 15 in position and its upper edge is in contact with the lower annular surface of the crystal 4. The bottom of the packing 3 is supported on the upper face 9 and on the surface 7, while the inner rim of the packing 3 is in contact with the surface 10, and the outer rim with the bezel 8. The wall of the channel is in contact with the packing 3 on all sides except the one in contact with the lower surface of the crystal 4.

What I claim is:

1. In a watch, a movement, a dial, a watertight case including a packing, a breakable glass having an outer conical surface and a lower annular surface in contact with the upper surface of said packing, a bezel with a conical inner surface pressing upon said conical outer surface of said breakable glass, a center member inside said bezel, having an upper face and a shoulder, and a separate ring inside said center member and supported on said shoulder and having a horizontal annular surface flush with said upper face and a vertical annular surface forming together with said horizontal annular surface a shoulder, said separate ring holding said movement and said dial in position, and being with its upper edge in contact with said lower annular surface of said breakable glass, the bottom of said packing being supported on said upper face and on said horizontal annular surface, the inner rim of said packing being in contact with said vertical annular surface, and the outer rim with said bezel.

2. In a watch, a movement, a dial, a watertight case including, a packing, a crystal having an outer conical surface and a lower annular surface in contact with said packing, a device comprising, a bezel with a conical inner surface pressing upon said conical outer surface of said crystal, a center member inside said bezel, having an upper face in contact with the bottom of said packing and a shoulder, and a separate ring inside said center member and supported on said shoulder and having a horizontal annular surface flush with said upper face and in contact with the bottom of said packing, and a vertical annular surface forming together with said horizontal annular surface a shoulder, said separate ring holding said movement and said dial in position, said bezel, upper face and said horizontal and vertical annular surfaces forming together a channel with its walls in contact with said packing on all sides except the one in contact with said lower annular surface of said crystal.

3. In a watch, a movement, a dial, a watertight case including, a packing, a crystal having an outer conical surface and a lower annular surface in contact with the upper surface of said packing, a device comprising, a bezel with a conical inner surface pressing upon said conical outer surface of said crystal, a center member inside said bezel, having an upper face in contact with the bottom of said packing and a shoulder, and a separate ring inside said contact member and supported on said shoulder and having a horizontal annular surface flush with said upper face and in contact with the bottom of said packing, and a vertical annular surface forming together with said horizontal annular surface a shoulder, said separate ring holding said movement and said dial in position, and being with its upper edge in contact with said lower annular surface of said crystal, said bezel, upper face and said horizontal and vertical annular surfaces forming together a channel with its walls in contact with said packing on all sides except the one in contact with said lower annular surface of said crystal.

HANS STEIMANN.

REFERENCES CITED

The following references are of record in the file of this patent:

UNITED STATES PATENTS

| Number | Name | Date |
|---|---|---|
| 626,703 | Jordan | June 13, 1899 |
| 1,208,707 | Jordan | Dec. 12, 1916 |
| 2,229,979 | Kramer | Jan. 28, 1941 |

FOREIGN PATENTS

| Number | Country | Date |
|---|---|---|
| 161,355 | Switzerland | July 1, 1933 |
| 205,243 | Switzerland | Aug. 16, 1939 |
| 210,111 | Switzerland | Aug. 16, 1940 |
| 215,447 | Switzerland | Sept. 16, 1941 |
| 569,912 | Germany | Feb. 9, 1933 |